US005673475A

United States Patent [19]

Takahashi

[11] Patent Number: 5,673,475

[45] Date of Patent: Oct. 7, 1997

[54] WIRE-LENGTH MEASURING APPARATUS

[75] Inventor: Sadao Takahashi, Machida, Japan

[73] Assignee: Molex Incorporated, Lisle, Ill.

[21] Appl. No.: 161,846

[22] Filed: Dec. 2, 1993

[30] Foreign Application Priority Data

Dec. 8, 1992 [JP] Japan .................................. 4-090238

[51] Int. Cl.$^6$ .................................. B23P 19/00

[52] U.S. Cl. .................................. 29/755; 29/857

[58] Field of Search .................................. 29/755, 33 F, 857, 29/861

[56] References Cited

U.S. PATENT DOCUMENTS

| | | | |
|---|---|---|---|
| 4,235,015 | 11/1980 | Funcik et al. | 29/857 |
| 4,253,222 | 3/1981 | Brown et al. | 29/33 F |
| 4,404,743 | 9/1983 | Brandewie et al. | 29/755 |
| 4,616,396 | 10/1986 | Matsui | 29/857 |
| 4,979,292 | 12/1990 | Fukuda et al. | 29/755 |
| 5,127,151 | 7/1992 | Weigert et al. | 29/755 |
| 5,282,311 | 2/1994 | Tamura | 29/33 F |

*Primary Examiner*—David P. Bryant
*Attorney, Agent, or Firm*—Charles S. Cohen

[57] ABSTRACT

Disclosed is an improved wire-length measuring apparatus including a rising-and-descending roller unit, which is designed to be lowered to pull down all or selected wires stretched under tension and each fed out of an associated wire supply reel to measure the wires in terms of a different level at which the wires are pulled down. The roller unit has upper and lower rollers. When the roller unit rises to an upper level for measuring a subsequent shorter wire length, some selected wires are withdrawn so that their valley points come up to the upper level. Pinch rollers are designed to invade somewhat the area between the upper and lower rollers of the roller unit just before the wire measurement starts, thereby keeping the withdrawn wires pushed against the upper and lower rollers just before the wire measurement is completed. As a result, curling of the withdrawn wires can be prevented.

19 Claims, 17 Drawing Sheets

WIRE-LENGTH MEASURING APPARATUS

FIELD OF THE INVENTION

The present invention relates to a wire-length measuring apparatus, and more particularly to an improved wire-length measuring apparatus using rising-and-descending rolls.

DESCRIPTION OF THE PRIOR ART

As is well know, electric harnesses whose insulated wires have electric connectors press-connected at one or both ends are used to connect one and another electric apparatuses. The insulated wires of such electric harnesses are of different lengths, and are selected to meet occasional length requirements. Accordingly apparatuses for making electric harnesses are designed to measure and cut desired lengths of insulated wires and press-connect electric connectors to one or both ends each of the so measured-and-cut insulated wires.

FIGS. 30 and 31 schematically show a conventional apparatus for making electric harnesses. It includes a rising-and-descending roll unit 45, the roll 46 of which is lowered to pull down a length of wire stretched under tension and fed out of an associated wires supply reel 40 to measure the wire w in terms of the level at which the wire w is pulled down. In the drawings, a guide roll is indicated at 41, a connector-carrier for supplying connectors R is indicated at 42, a wire-clamping cylinder is indicated at 43, and a counter roll is indicated at 44.

The apparatus is useful in measuring wires. However, it has the following deficiency. As seen from FIG. 31, after measuring the wire w, the roll 46 of the rising-and-descending roll unit 45 is allowed to rise to its original position, and then the pull-out wire w is released from tension. Then the part of the pull-out wire w extending from the roll 46 of the rising-and-descending roll unit 45 to the electric connector press-connected end is liable to curl. Disadvantageously the curling prevents the rising of the rising-and-descending roll unit 45, and causes the tangling of wires. Accordingly the wire measuring and connector press-connecting cannot be performed at an increased efficiency.

SUMMARY OF THE INVENTION

One object of the present invention is to provide a wire-length measuring apparatus which allows wires to descend naturally under gravity without curling after being released from tension subsequent to completion of wire measurement, thus assuring smooth rising of the roll unit and avoiding the tangling of the wires, and accordingly improving the efficiency with which electric: harnesses are manufactured.

To attain this and other objects a wire-length measuring apparatus including a rising-and-descending roll unit, the roll of which is lowered to pull down wires stretched under tension and each fed out of an associated wire supply reel to measure wires in terms of a different level at which the wires are pulled down, is improved according to the present invention in that: aid roll unit has a lower roll to pull down wires and an upper roll spaced from said lower roll; and said apparatus further comprises a pinch roll unit which comprise at least one pinch roll to invade somewhat the area between said upper and lower rolls of said roll unit on the side opposite to the wire-supplying side before said lower roll start for wire measurement, thereby keeping the wire pushed against the surfaces of said upper and lower rolls just before the wire measurement is completed.

With this improved arrangement the pinch roll invades somewhat the area between said upper and lower rolls of said roll unit on the side opposite to the wire-supplying side before said lower roll starts for wire measurement, that is, before the lower roll descends to a selected level, thereby keeping the wire pushed against the surfaces of the upper and lower rolls, and releasing the pinch roll just before the wire measurement is completed. The part of the wire length between the lower roll and the press-connected wire end is prevented from curling.

BRIEF DESCRIPTION OF THE DRAWINGS

Other objects and advantages of the present invention will be understood from the following description of harness manufacturing apparatuses according to preferred embodiments of the present invention, which are shown in accompanying drawings.

DETAILED DESCRIPTION OF THE PREFERRED EMBODIMENT

FIGS. 1 to 17 show a wire-length measuring apparatus according to a first embodiment of the present invention. First, referring to FIG. 1 to 13, a description is given as to how the measuring of a plurality of wires, particularly five wires W1 to W5 may be effected.

Figure 1:
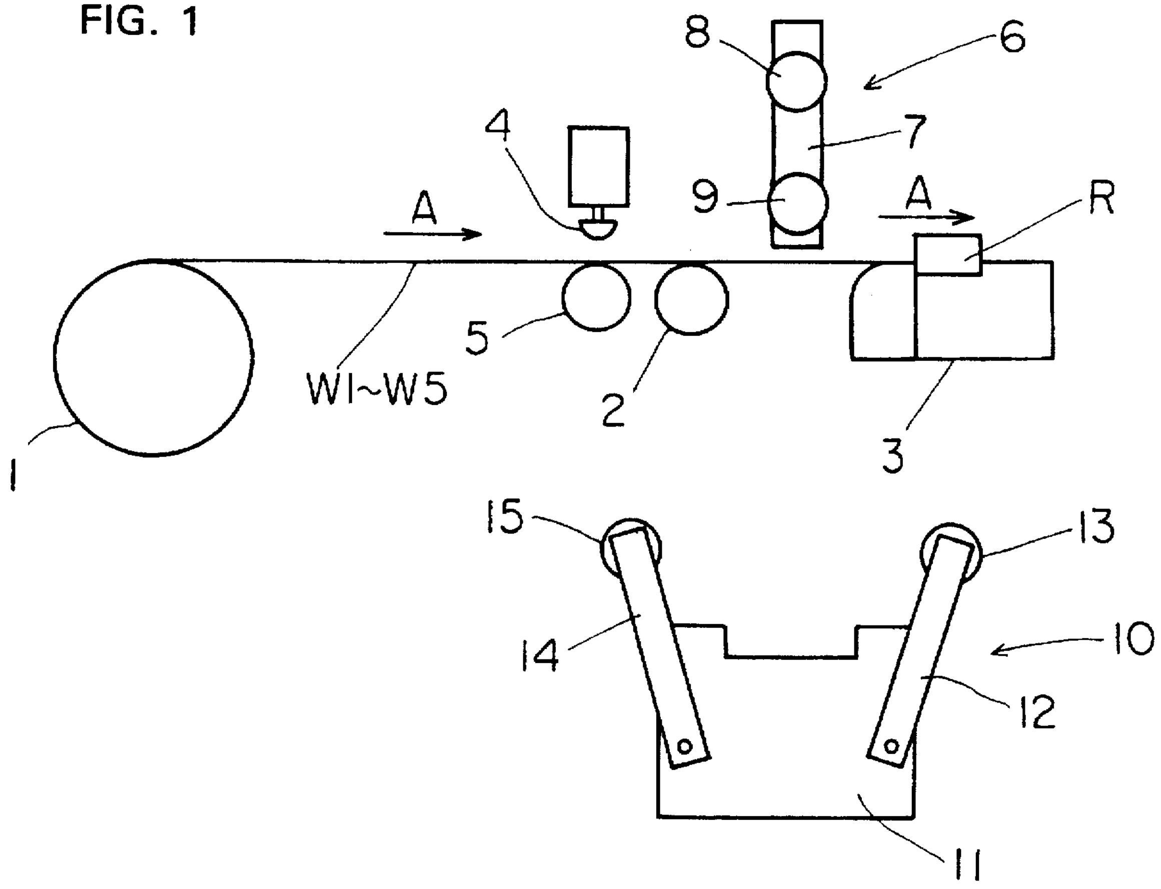
FIG. 1 schematically shows a wire-length measuring apparatus of the present invention, feeding a plurality of insulated wires each having an electric connector press-connected at its one end.

Referring to FIG. 1, wire supply reels 1, wireclamping cylinders 4, guide roller 2, and electric connector carrier 3 are allotted for different wires W1 to W5 to be measured respectively, and these components are arranged laterally at the same intervals a these wires. These parallel wire supply reels 1, the parallel wireclamping cylinders 4 and a counter roller 5, the parallel guide roller 2 and the parallel electric connector carriers 3 are arranged in the order named longitudinally in the direction "A" in which the parallel wire supply reels 1 feed the wires W1 to W5.

FIG. 1 shows the wire-length measuring apparatus in condition that all wires W1 to W5 having electric connector R press-connected at their ends are stretched by moving the electric connector carrier 3 rightward and by stopping it at a predetermined position, thus extending all wires over a predetermined length. After the wire-feeding stops, a backward rotating force is applied to the wire supply reels 1 by appropriate spring means to stretch the wires W1 to W5 in tension. In these drawings, devices from press-connecting electric connector R to the ends of wires W1 to W5 are omitted for the sake of simplicity of drawing.

As seen from FIG. 1, a rising-and descending roller unit 6 is placed between the guide rolls 2 and a right fixed position to which the electric connector R is brought by the electric connector carrier 3. This roller unit 6 comprises a roller support 7, a lower roller 9 rotatably fixed to the roller support 7, and an upper roller 8 spaced a given distance from the lower roller 9 and fixed to the roller support 7. As seen from FIGS. 16 and 17, the lower roller 9 has grooves 17 made its circumference to receive the wires W1 to W5.

Figure 14:
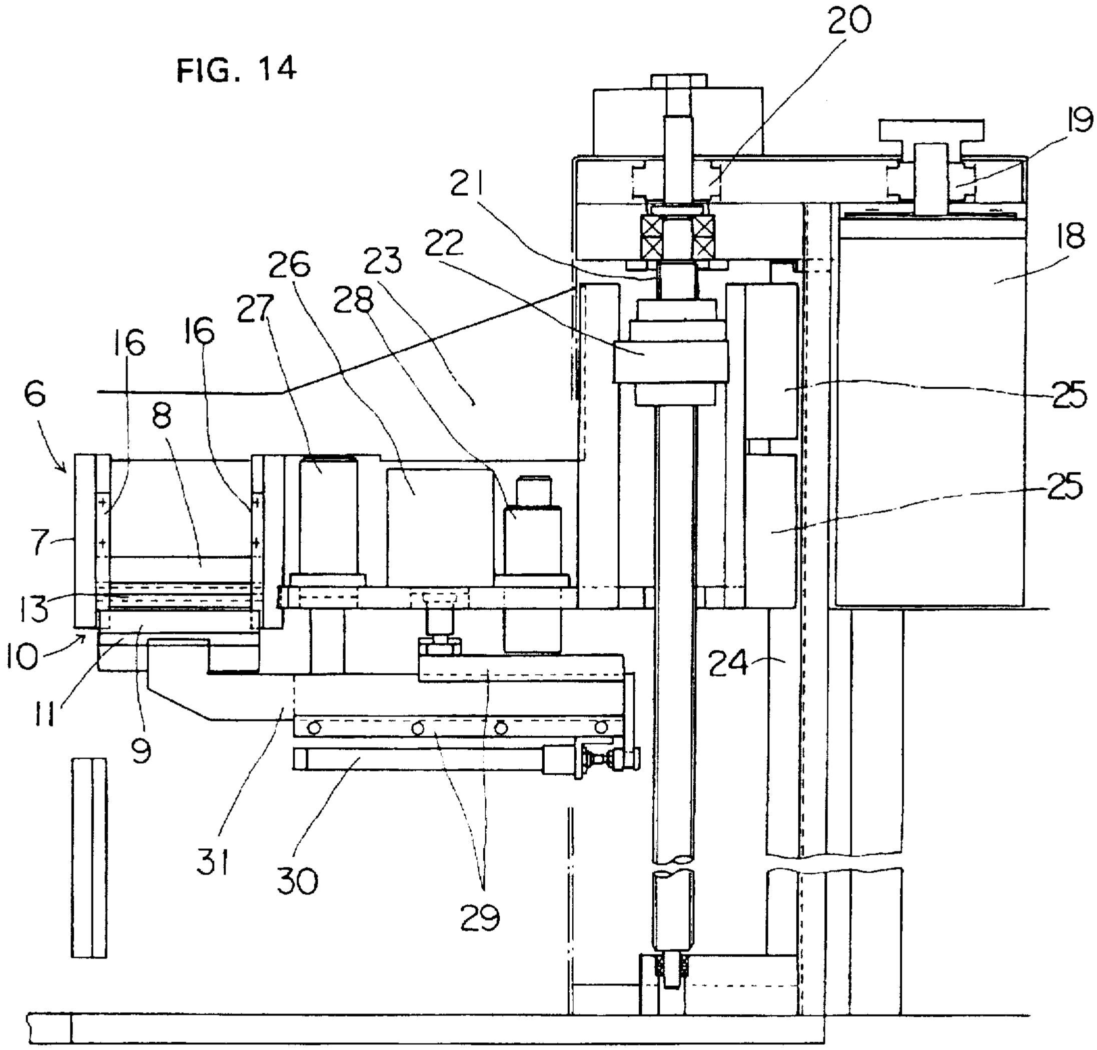
FIG. 14 is a front view of the roller unit and the pinch rollers in combination.
Figure 15:
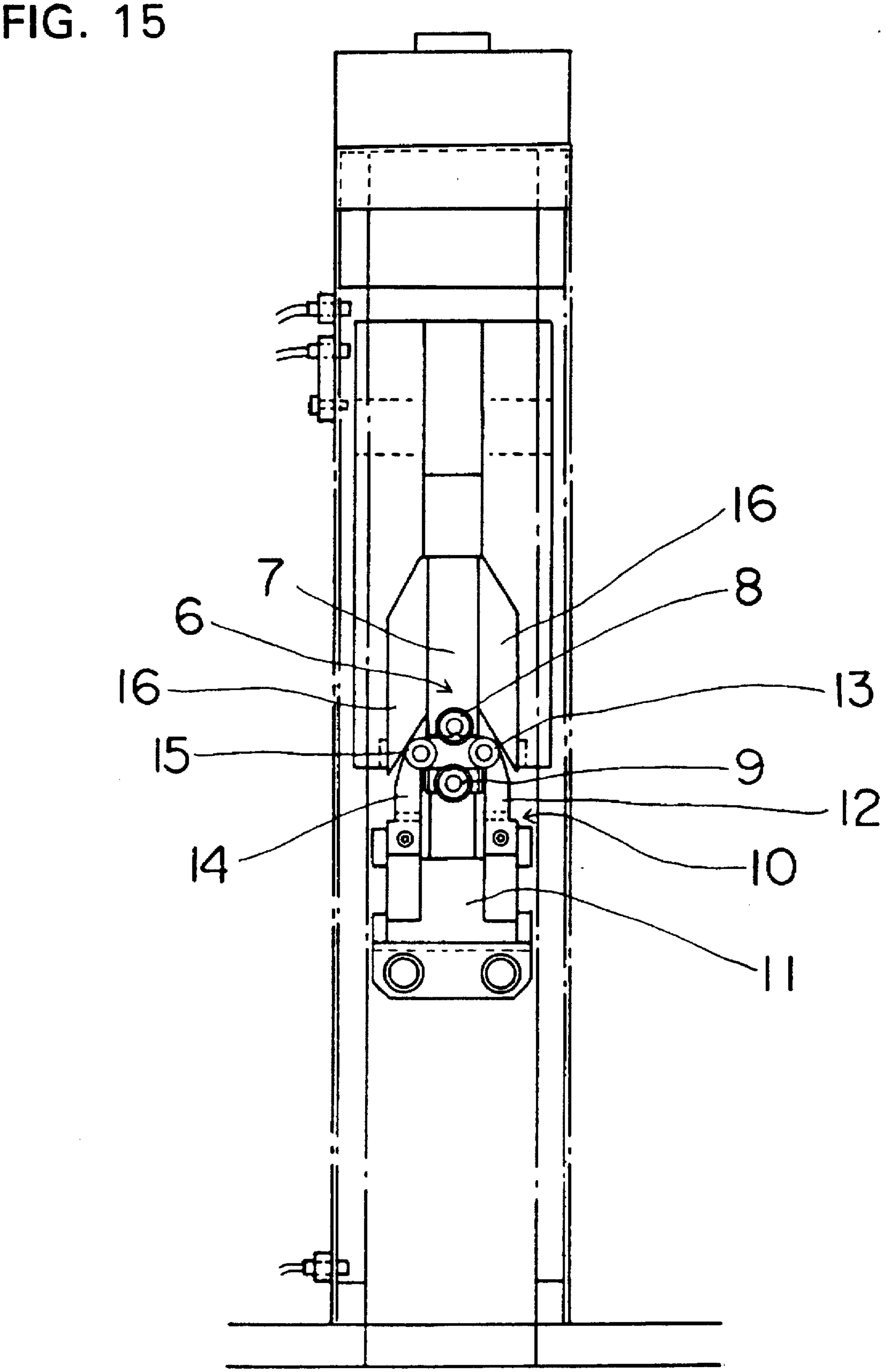
FIG. 15 is a left side view of the combination of FIG. 14.
Figure 16:
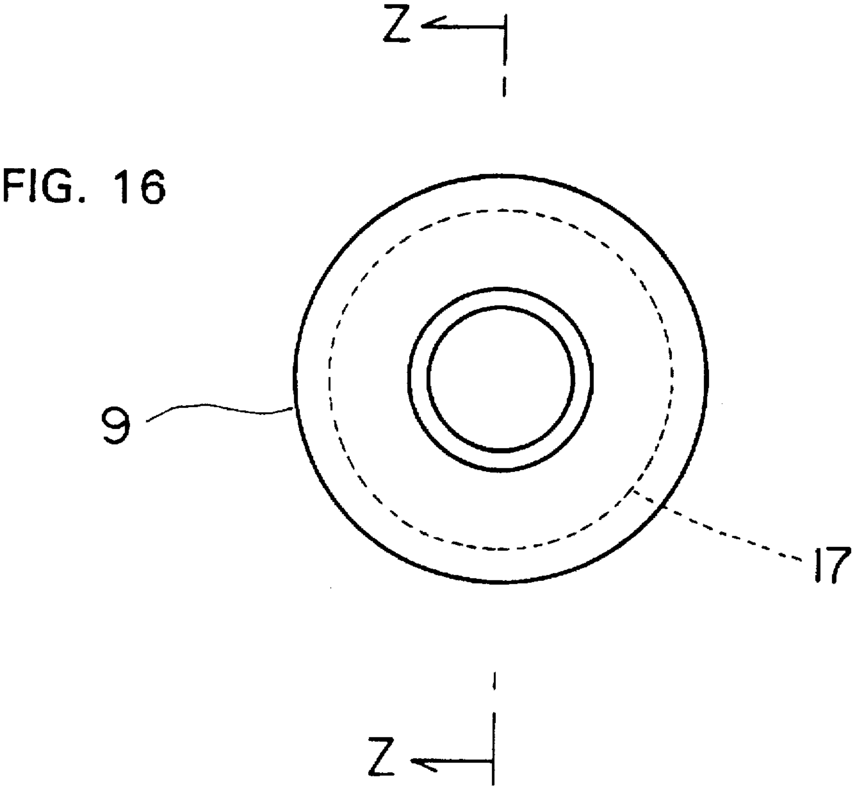
FIG. 16 is a front view of the lower roller of the rollers unit.
Figure 17:
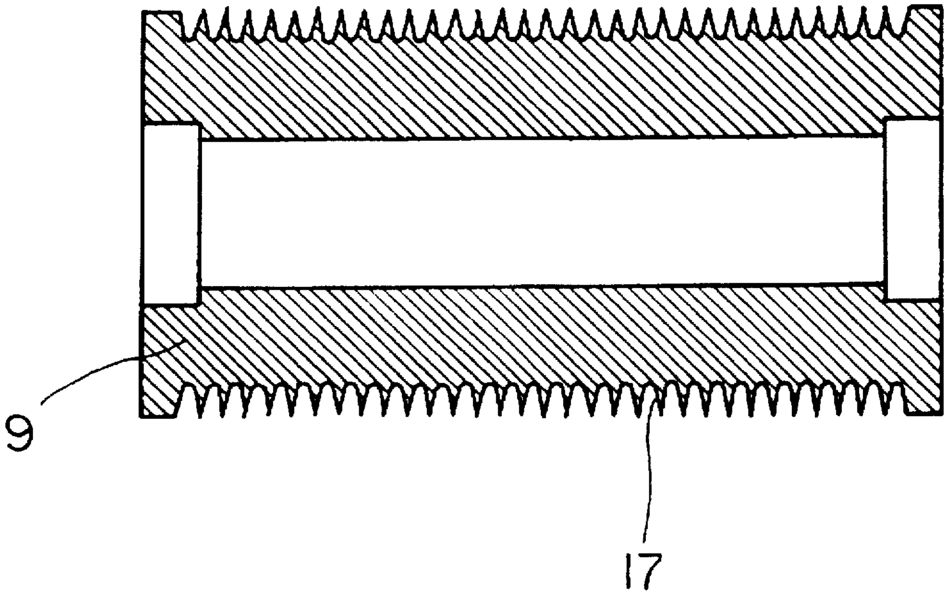
FIG. 17 is a longitudinal section of the lower roller taken along the line Z—Z in FIG. 16

A pinch roller unit 10 is positioned between the guide roller 2 and the right fixed position, opposite to the rising-and-descending roller unit 6. It comprises a rising-and-descending support 11 and two swingable arms 12 and 14. These arms 12 and 14 are swingably fixed to the support 11, and they have pinch rollers 13 and 15 at their ends. Some details of such pinch roll unit 10 are shown in FIGS. 14 and 15, and will be later described.

Figure 2:
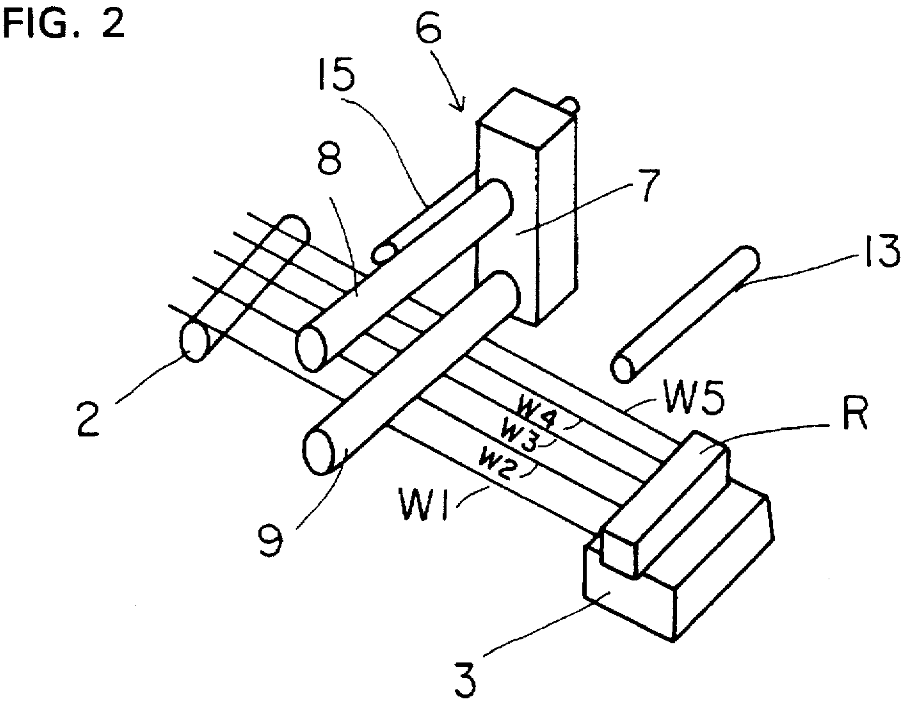
FIG. 2 is a perspective view of the measuring part of the wire-length measuring apparatus of FIG. 1.

With reference to FIGS. 1 to 13 a series of measuring operations are described below. First, as shown in FIGS. 1 and 2, electric connector R is press-connected to the ends of all wires W1 to W5 by a press-connecting unit (not shown), and then, the so press-connected electric connector R is carried in the right direction A by the electric connector carrier 3. After the feeding of all wires W1 to W5 stops, the wire supply rolls 1 are rotated counterward to pull all wires W1 to W5 backward, thereby stretching these wires under tension. In this condition the roller unit 6 remains at the raised, original position whereas the pinch roller unit 10 remains at the lowered, original position, keeping its swingable arms 12 and 14 open, and hence keeping the pinch rolls 13 and 15 apart from each other.

Figure 3:
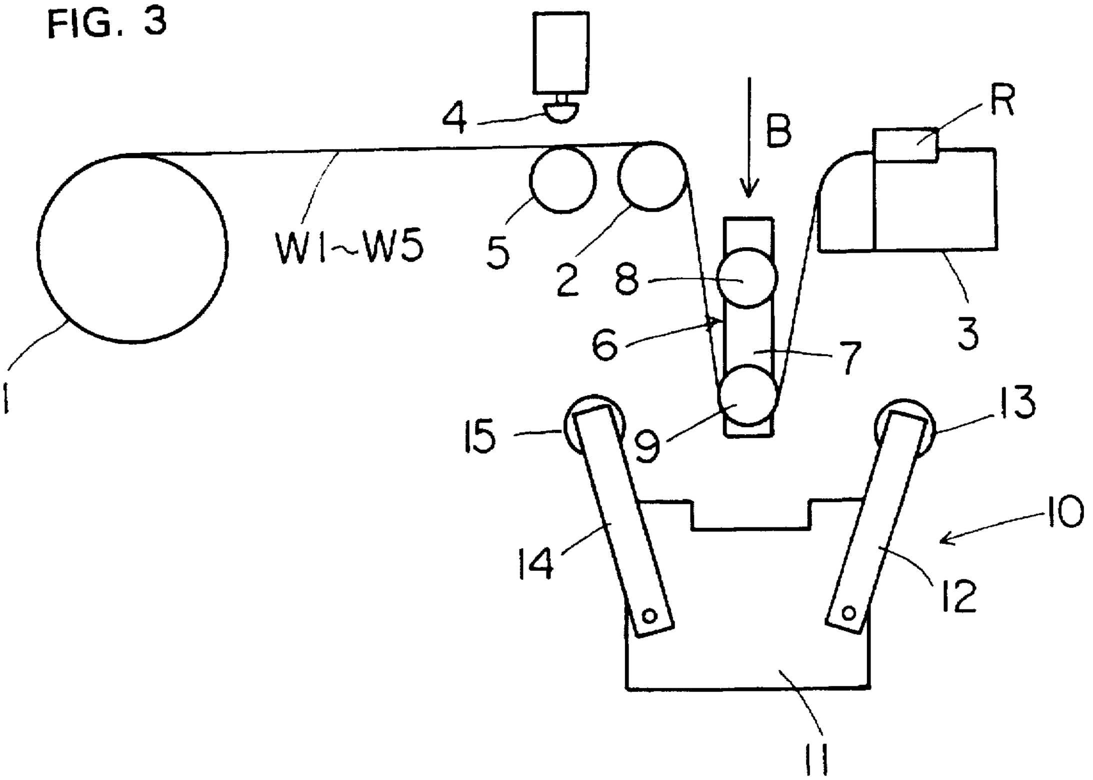
FIG. 3 schematically shows the wire-length measuring apparatus starting the measuring of the wires.
Figure 4:
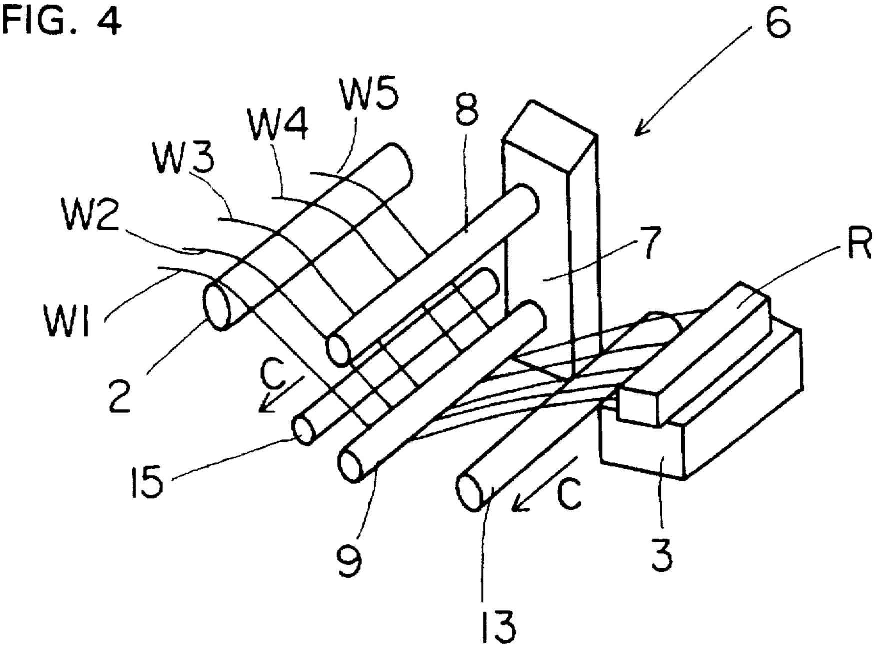
FIG. 4 is a perspective view of the measuring part of the wire-length measuring apparatus starting the measuring of the wires.

Then, the roller unit 6 is lowered to cause all wires W1 to W5 to yieldingly descend as indicated at B in FIGS. 3 and 4, thus starting the wire measurement. Specifically, all wires W1 to W5 are fitted in the circumferential grooves 17 of the lower roller 9, and are pulled down. When these descending wire form an angle of for instance, 60 degrees, the pinch rollers 13 and 15 are moved longitudinally to come close to the two sides of the "V"-shaped descending wires as indicated at arrows C.

Figure 5:
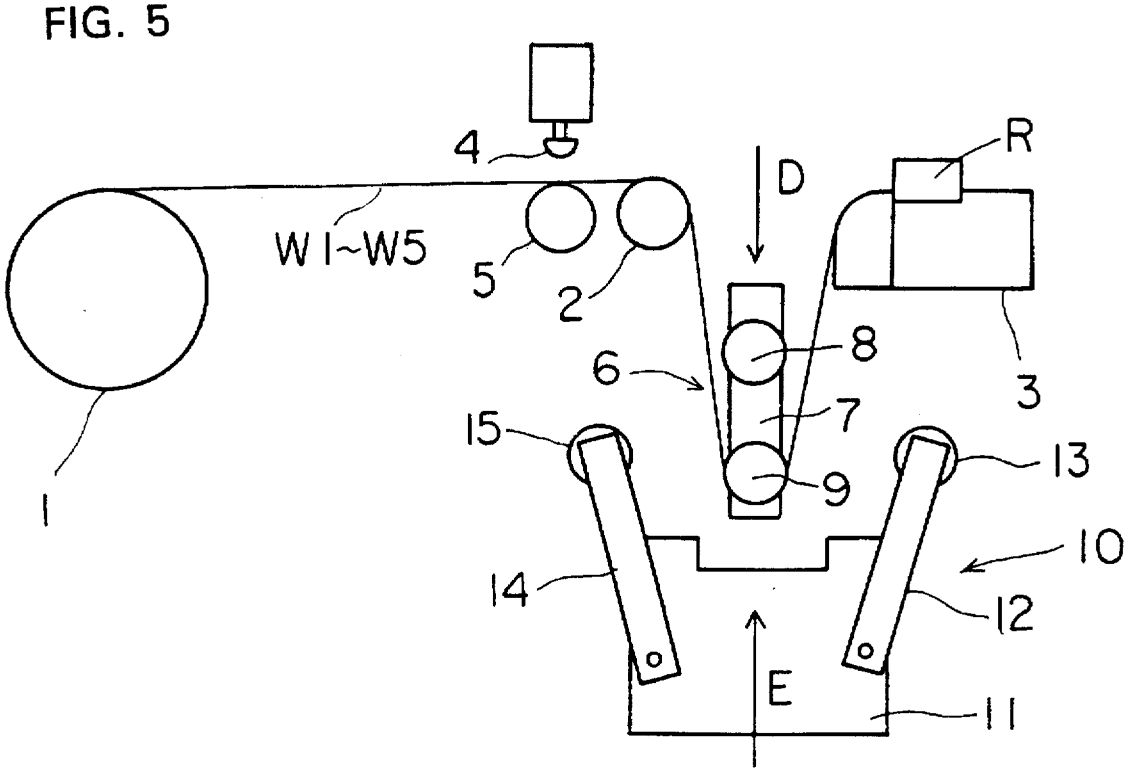
FIG. 5 schematically shows the wire-length measuring apparatus in the condition that it pinch rollers start rising.
Figure 6:
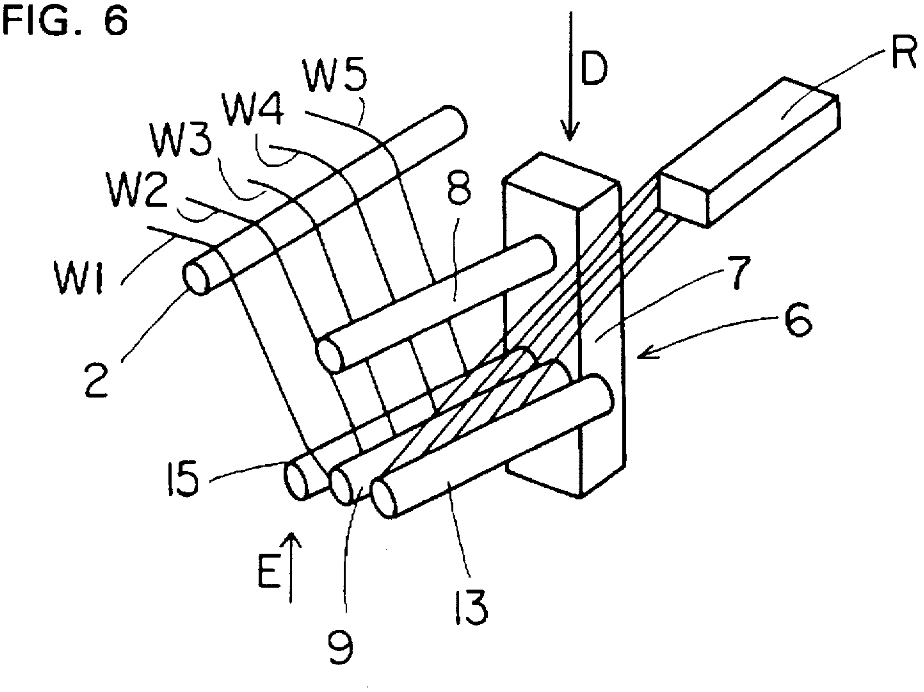
FIG. 6 is a perspective view of the measuring part of the wire-length measuring apparatus in the condition of FIG. 5.
Figure 7:
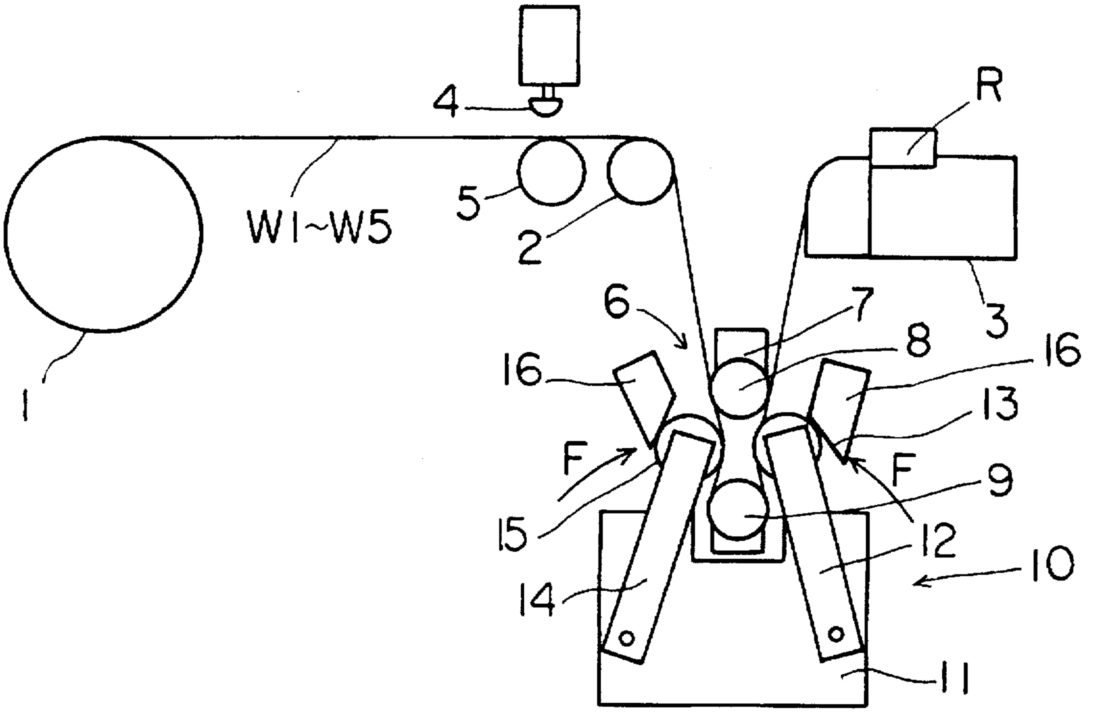
FIG. 7 schematically shows the wire-length measuring apparatus in the condition that its pinch rollers are in operating position, performing wire measurement for a longest length.
Figure 8:
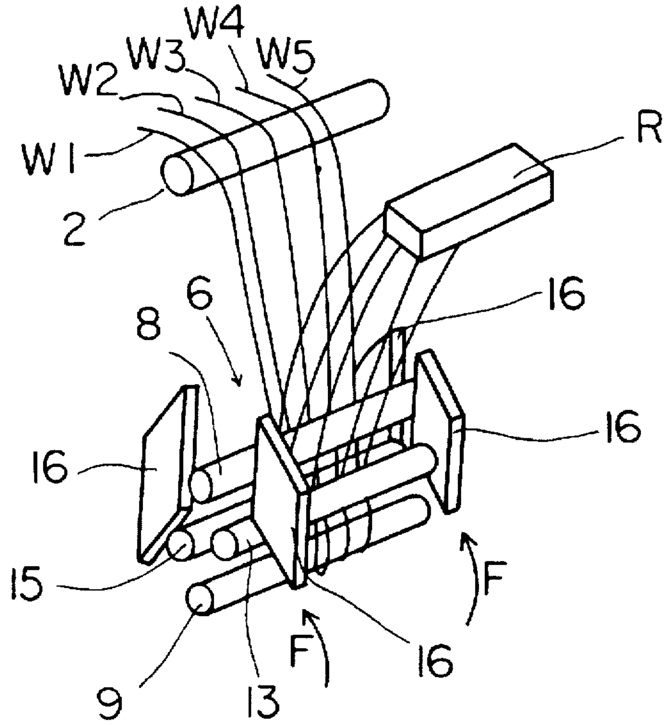
FIG. 8 is a perspective view of the measuring part of the wire-length measuring apparatus in the condition of FIG. 7.

The roller unit 6 continues descending as indicated by arrow D in FIGS. 5 and 6. The descending amount depends on a wire length to be determined. The pinch rollers 13 and 15 advance full distance forward, and the pinch roller unit 10 starts rising as indicated by arrow E.

Now, assume that two wires W4 and W5 are determined for a longest length L1 and that three remaining wires W1, W2 and W3 are determined for a second longest length L2. First, all wires W1 to W5 are lowered to the lowest level corresponding to the longest length L1 by the roller 9. Before starting the longest length wire measurement subsequent to the pulling-down of all wires to the lowest level, the swingable arms 12 and 14 come close to each other as indicated by arrows F in FIGS. 7 and 8 to permit the pinch rollers 13 and 15 to invade somewhat the area between the upper and lower rolls 8 and 9 (for instance, 1 millimeter inside) on either side of the roller unit 6.

Thus, upon wire measurement all wires W1 to W5 are kept pushed against the upper and lower rolls 8 and 9 by the pinch rolls 13 and 15.

The inventor found that the wire measurement effected in this condition has the effect of preventing the curling of wires between the lower roller 9 and the electrical connector press-connected wire ends. The pinch rollers 13 and 15 are released just before completion of the wire measurement. The swinging of the swingable arms may be controlled with the aid of cam plates 16.

Figure 9:
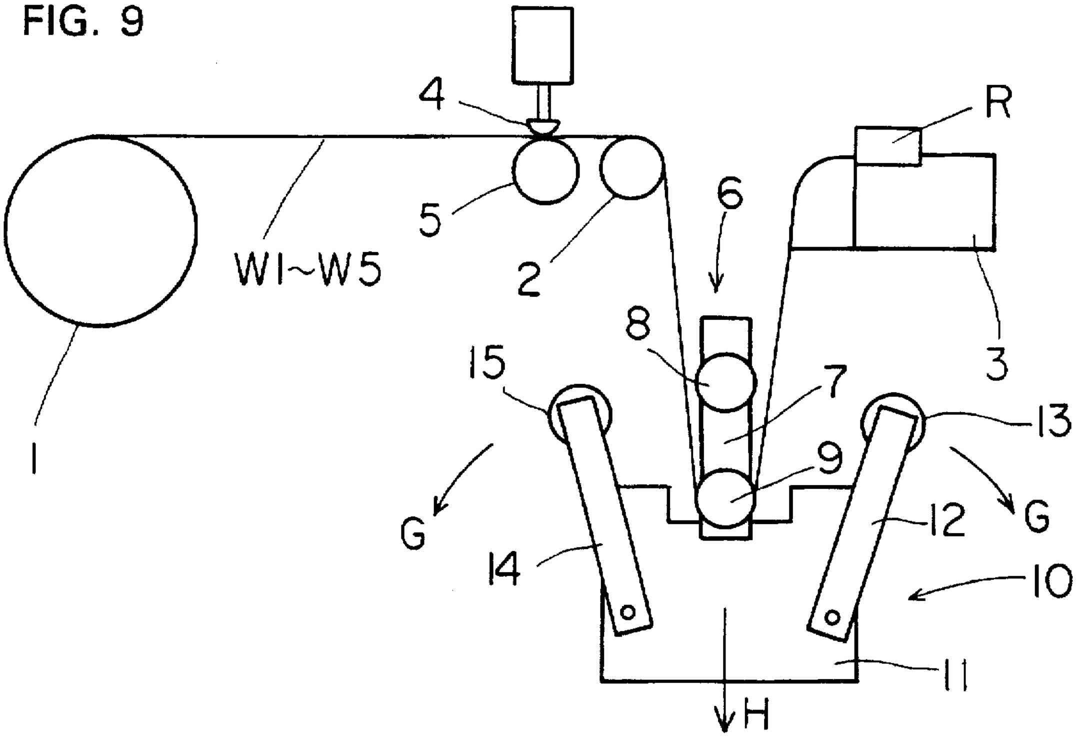
FIG. 9 schematically shows the wire-length measuring apparatus in the condition that its pinch rollers have returned to their original positions after completion of wire measurement for a longest length.
Figure 10:
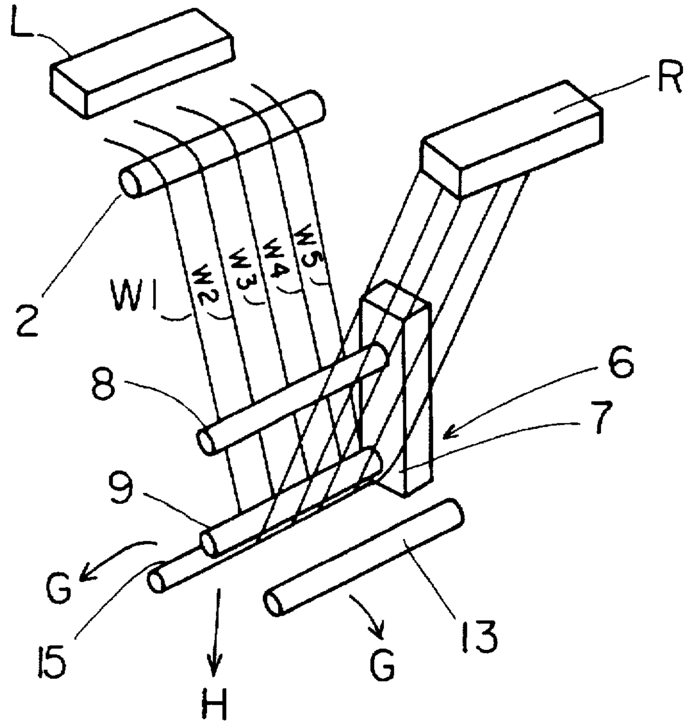
FIG. 10 is a perspective view of the measuring part of the wire-length measuring apparatus in the condition of FIG. 9.
Figure 11:
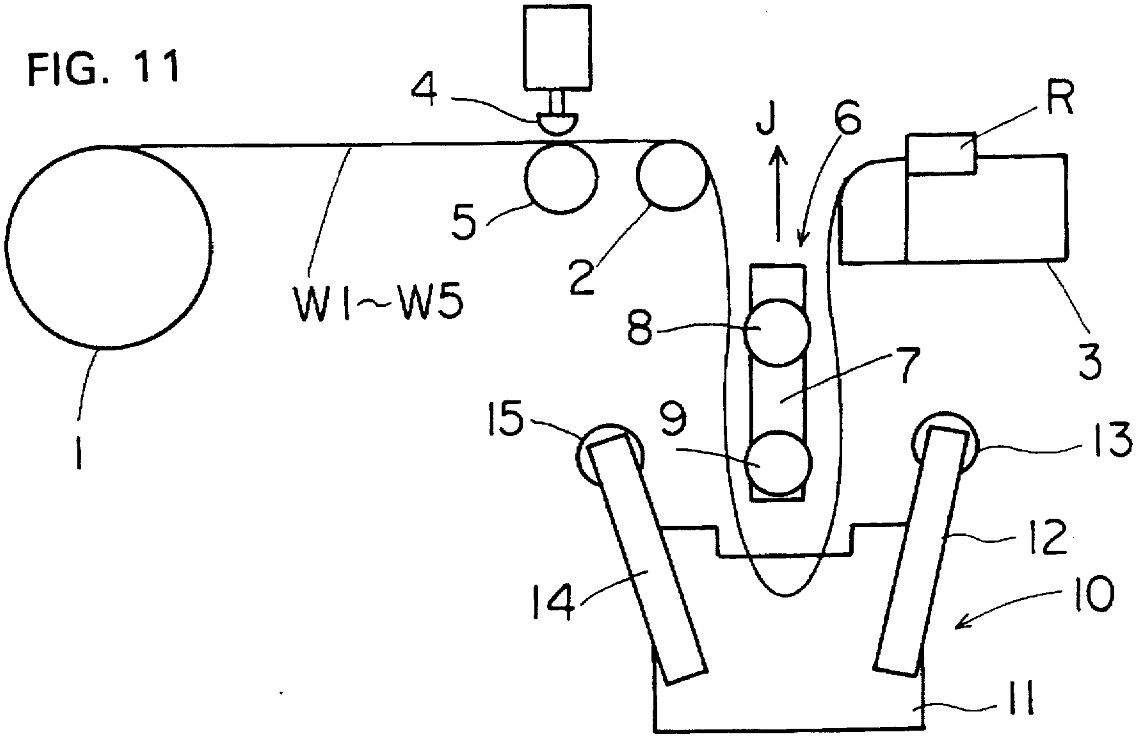
FIG. 11 schematically shows the wire-length measuring apparatus in the condition that its roller unit starts rising to the level at which a second longest length measurement is effected.

As shown in FIGS. 9 and 10, the pinch rollers 13 and 15 are retracted as indicated by arrows G just before completion of the longest wire measurement, and at the same time, the support 11 starts returning to the lower, original position as indicated by arrow H. After that, the roller unit 6 starts rising.

All wires W1 to W5 are extended to the longest length L1, even though three W1, W2 and W3 of these wires will ultimately be shorter than the remaining two wires W4 and W5. Then, the roller unit 6 rises as indicated by arrow J in FIG. 11 until its lower roller 9 reaches the second lower level corresponding to the second longest length L2.

Figure 12:
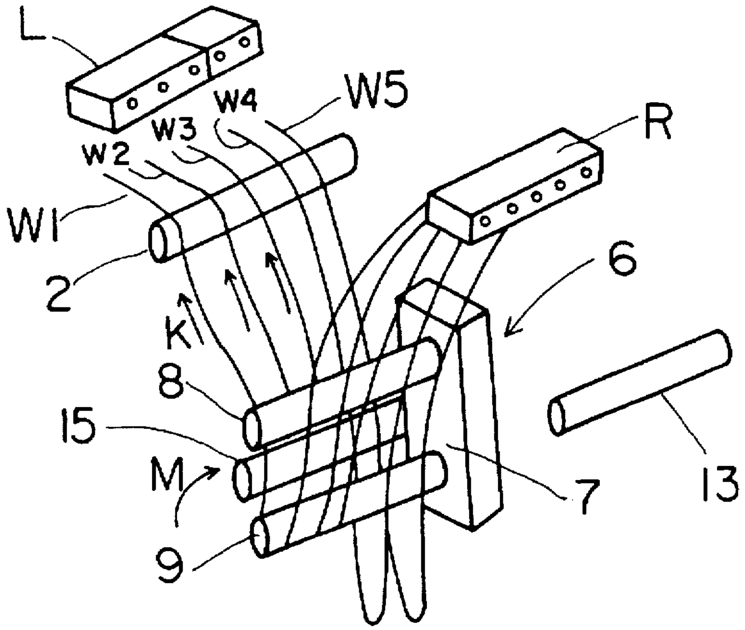
FIG. 12 is a perspective view of the measuring part of the wire-length measuring apparatus in the condition that selected wires have been withdrawn to the wire supply reels for a second longest measurement.

As shown in FIG. 12, the wires W1 to W3 to be measured for the second longest length L2 are withdrawn toward the associated wire supply reels 1 as indicated by arrow K, thereby performing the second longest wire measurement. The pinch roller 13 returns to its original position. The other pinch roller 15, however, remains in the same invading-and pushing position as before, as indicate by arrow M. Thus keeping the pushes W1 to W3 pushed against the upper and lower rollers 8 and 9 during wire measurement, and then, the pinch roll 15 leaves the area between the upper and lower rolls 8 and 9 just before completion of wire measurement.

Figure 13:
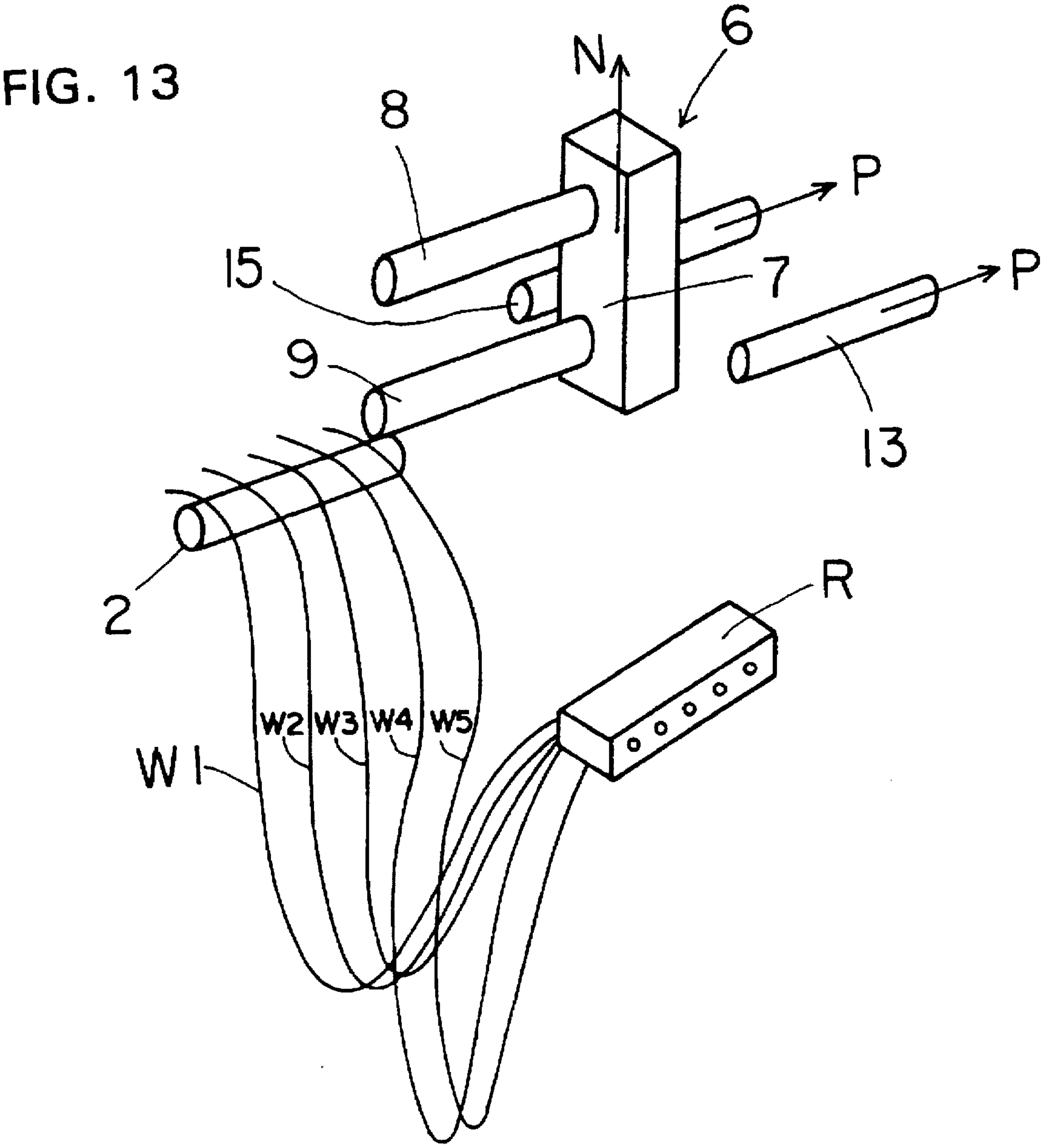
FIG. 13 is a perspective view of the measuring part of the wire-length measuring apparatus in the condition that measurements of all wires have been completed.

The longest and second longest measurements of all wires W1 to W5 are completed, and then, the roller unit 6 rises as indicated by arrow N and the pinch rolls 13 and 15 return to their original positions P, as shown in FIG. 13.

Electric connectors L (FIG. 12) may be press-connected to the other or left ends of the longest and second longest wires, or the other or left ends of these wires may be left free of electric connectors.

The operations of the pinch rollers 13 and 15 in determining different lengths L1 and L2 are described above. In determining a single wire from a given length or in determining a plurality of wires to be equal in length the pinch rollers 13 and 15 are apart from each other upon completion of a single required wire measurement, descending and returning backward to their original positions.

FIG. 14 shows one example of the roller unit as using a reversing motor 18 to raise or lower the roller unit body 6. Specifically, rotation of the motor 18 is transmitted to sprocket wheels 19 and 20 to cause rotation of an associated screw shaft 21 to raise or lower an associated rising-and-descending piece 22, thereby causing an associated support arm 23 to rise or descend, and accordingly permitting the upper and lower rolls 8 and 9 to rise or descend. This rising and descending may be effected smoothly thanks to a guide means 25 on a guide rail 24.

The controlling of the descending distance to perform a required length measurement, and the controlling of rising and descending timing may be made by a control for the motor.

As shown in FIGS. 14 and 15, a rising-and-descending cylinder 26 may be used in raising, and lowering the pinch rollers 13 and 15. Specifically, the rising-and-descending of the cylinder 26 causes associated rising-and-descending plates 29 to rise and descend under the guidance of guide means 27 and 28, accordingly raising and lower the pinch rollers 13 and 15. A reciprocating cylinder 30 may be used in reciprocating the pinch roller 13 and 15. Specifically, the pinch rolls 13 and 15 may be connected to the reciprocating cylinder 30 via a connecting rod 31. Other appropriate drive means may be used.

Referring to FIGS. 18 to 23, wire-length measuring apparatus according to a second embodiment is described. This apparatus is different from the first embodiment only in that: the second embodiment uses only one pinch roller 13 whereas the first embodiment uses two pinch rollers 13 and 15. The use of one pinch roller, however, still has the effect of preventing the curling of the portions of the wires extending from the electric connector press-connected ends to the lower roller 9 of the roller unit 6.

Figure 18:
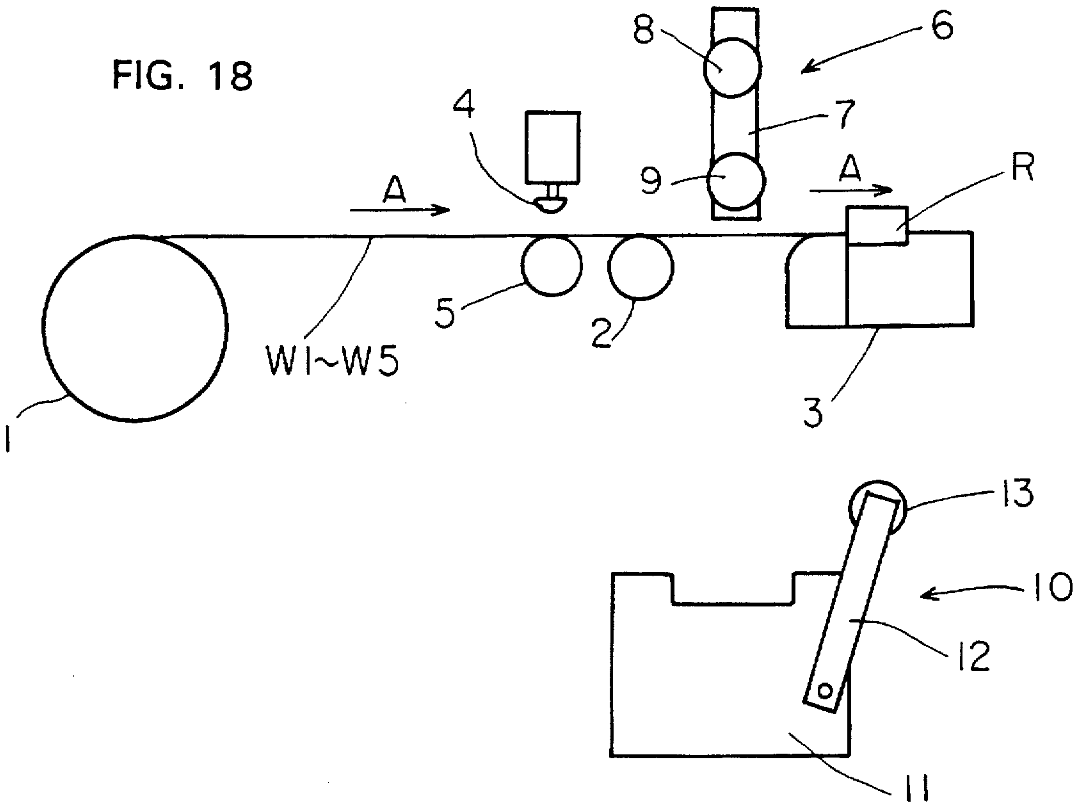
FIG. 18 schematically shows a wire-length measuring apparatus according to a second embodiment prior to the starting of wire measurement.

First, as shown in FIG. 18, electric connector R is press-connected to the right ends of all wires W1 to W5, and then, the so press-connected electric connector R is carried in the right direction A by the electric connector carrier 3. After the feeding of all wires W1 to W5 stops, the wire supply rolls 1 are rotated counterward to pull all wires W1 to W5 backward, thereby stretching these wires under tension. In this condition the roller unit 6 remains at the raised, original position whereas the pinch roller unit 10 remains at the lowered, original position, keeping its swingable arm 12 open, and hence keeping the pinch roller 13 withdrawn.

Figure 19:
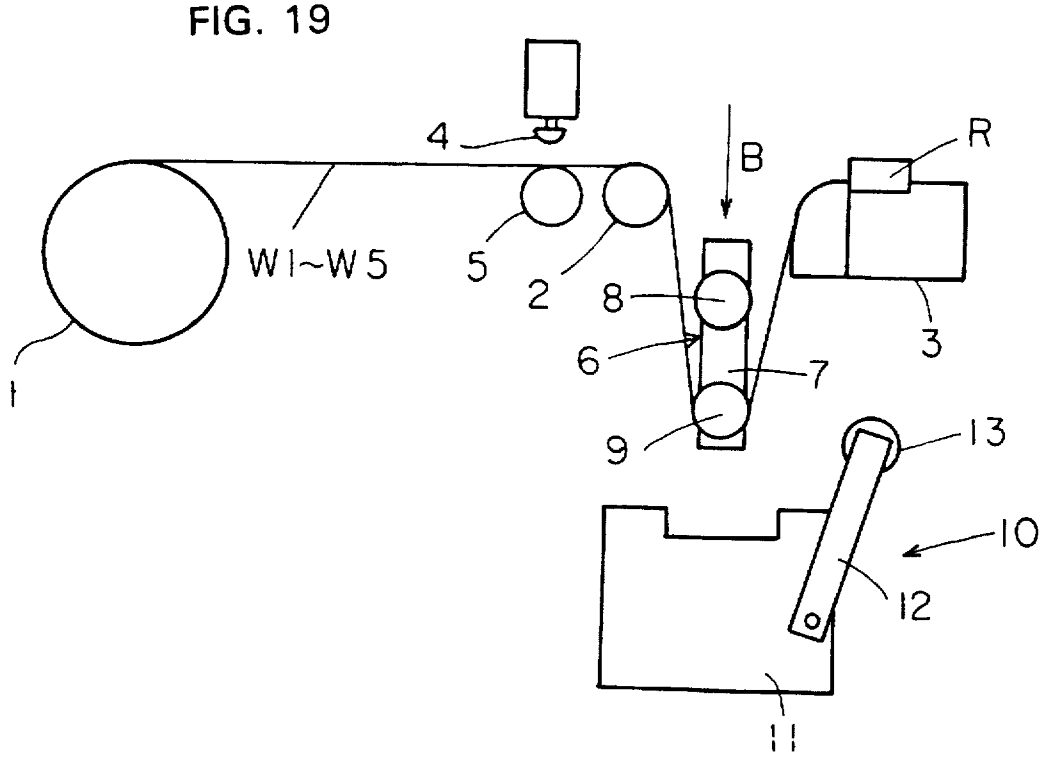
FIG. 19 schematically shows the wire-length measuring apparatus of FIG. 18 starting the measuring of the wires.

Then, the roller unit 6 is lowered to cause all wires W1 to W5 to yieldingly descend as indicated at B in FIG. 19, thus starting the wire measurement. Specifically, all wires W1 to W5 are fitted in the circumferential grooves 17 of the lower roller 9, and are pulled down.

Figure 20:
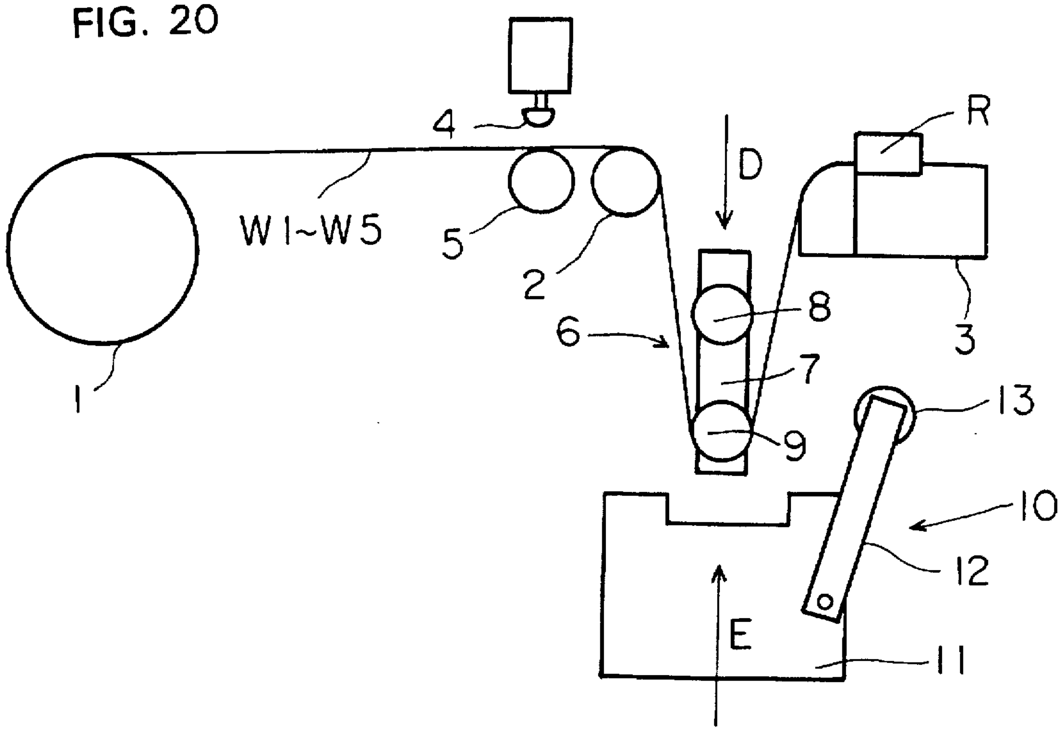
FIG. 20 schematically shows the wire-length measuring apparatus of FIG. 18 in the condition that its roller unit starts to lower.
Figure 21:
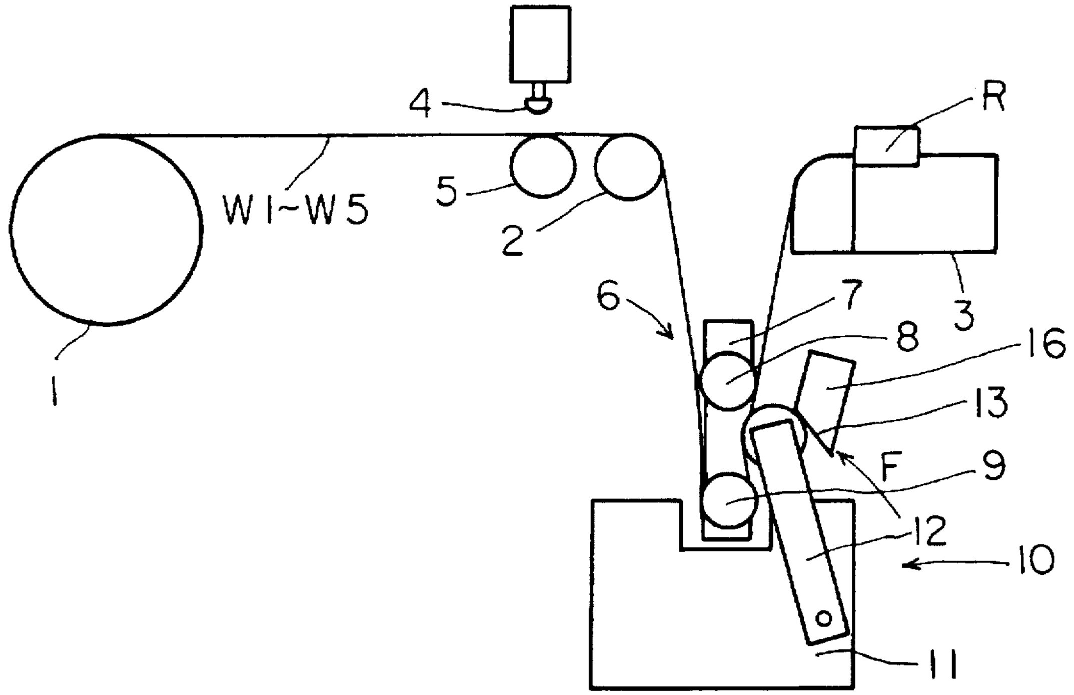
FIG. 21 schematically shows the wire-length measuring apparatus of FIG. 18 in the condition that wire measurement is effected.
Figure 22:
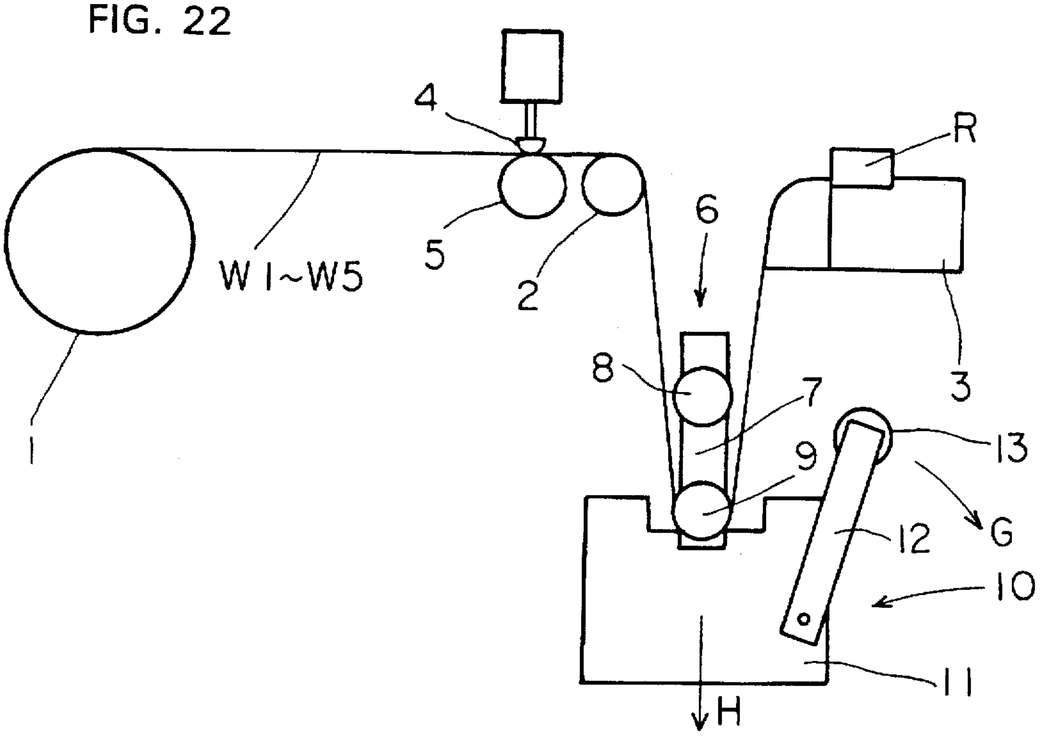
FIG. 22 schematically shows the wire-length measuring apparatus of FIG. 18 in the condition that its pinch rollers return to their original positions.

The roller unit 6 continues descending as indicated by arrow D in FIG. 20. The descending amount depends on a wire length to be determined. The pinch roller 13 advances the full distance forward parallel to the axis of roller 13, and the pinch roller unit 10 starts rising as indicated by arrow E.

First, all wires W1 to W5 are lowered to a lowest level corresponding to the longest length L1 by the roll 9. Before starting the longest length wire measurement subsequent to the pulling-down of all wires to the lowest level, the swingable arm 12 rotates inward as indicated by arrow F in FIG. 21 to permit the pinch roller 13 to invade somewhat the area between the upper and lower rollers 8 and 9 on one side of the roller unit 6. For instance, the pinch roller 13 is made to stop, exceeding one millimeter beyond the line extending tangentially along the upper and lower rollers 8 and 9 of the roller unit 6.

Thus, upon wire measurement, all wires W1 to W5 are kept pushed against the upper and lower rollers 8 and 9 by the pinch roller 13 on one side of the roller unit 6.

Figure 23:
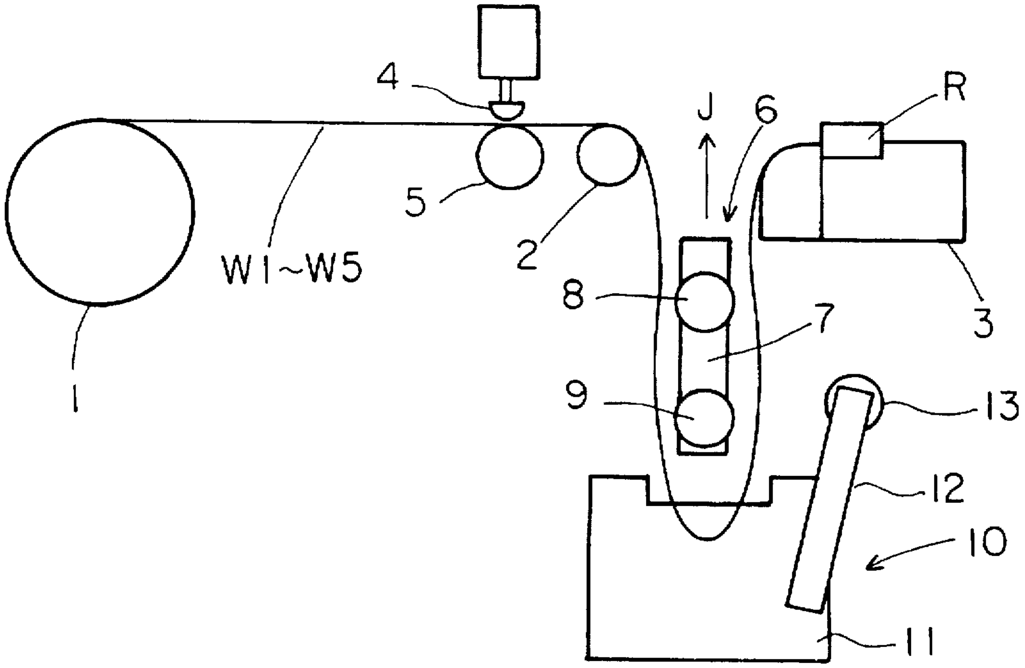
FIG. 23 schematically shows the wire-length measuring apparatus of FIG. 18 in the condition that its roller unit starts to rise to the level at which a second longest length measurement is effected.
Figure 24:
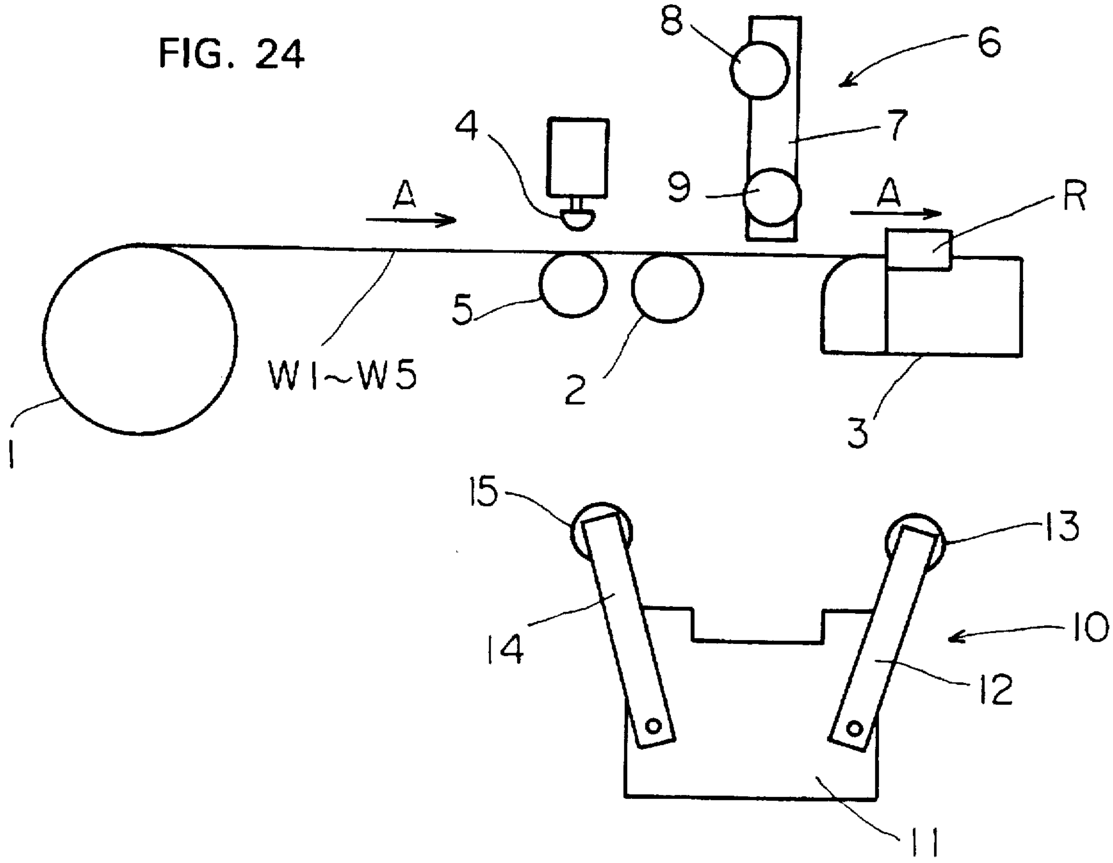
FIG. 24 schematically shows a wire-length measuring apparatus according to a third embodiment prior to the start of wire measurement.

The inventor found that the wire measurement effected in this condition prevents the curling of wires between the lower roller 9 and the electrical connector press-connected wires ends. The pinch roller 13 is released just before completion of the wire measurement as seen from FIG. 22. Then in the same way as the first embodiment, the wire-length measuring apparatus proceeds to the subsequent step as shown in FIG. 23.

Referring to FIGS. 24 to 29, a wire-measuring apparatus according to a third embodiment the present invention is described below. It is a modification of the first embodiment, and is appropriate for the purpose of measuring different wire lengths. Specifically, when the lower roller 9 starts rising for measuring a subsequent shorter wire length sequential to completion of a preceding wire measurement, and when some wires selected to be measured subsequently are withdrawn toward the wire supply reels 1, the pinch roller 15 is put in contact with the upper roll 8 to push the selected wire which are being pulled back.

As is the case with the first or second embodiment, electric connector R is press-connected to the right ends of all wires W1 to W5, and then, the so press-connected electric connector R is carried in the right direction A by the electric connector carrier 3. After the feeding of all wires W1 to W5 stops, the wire supply rolls 1 are rotated counterward to pull all wires W1 to W5 backward, thereby stretching these wires under tension. In this condition the roll unit 6 remains as the upper, original position whereas the pinch roll unit 10 remains at the lower, original position, keeping its swingable arms 12 and 14 open, and hence keeping the pinch rollers 13 and 15 withdrawn.

Figure 25:
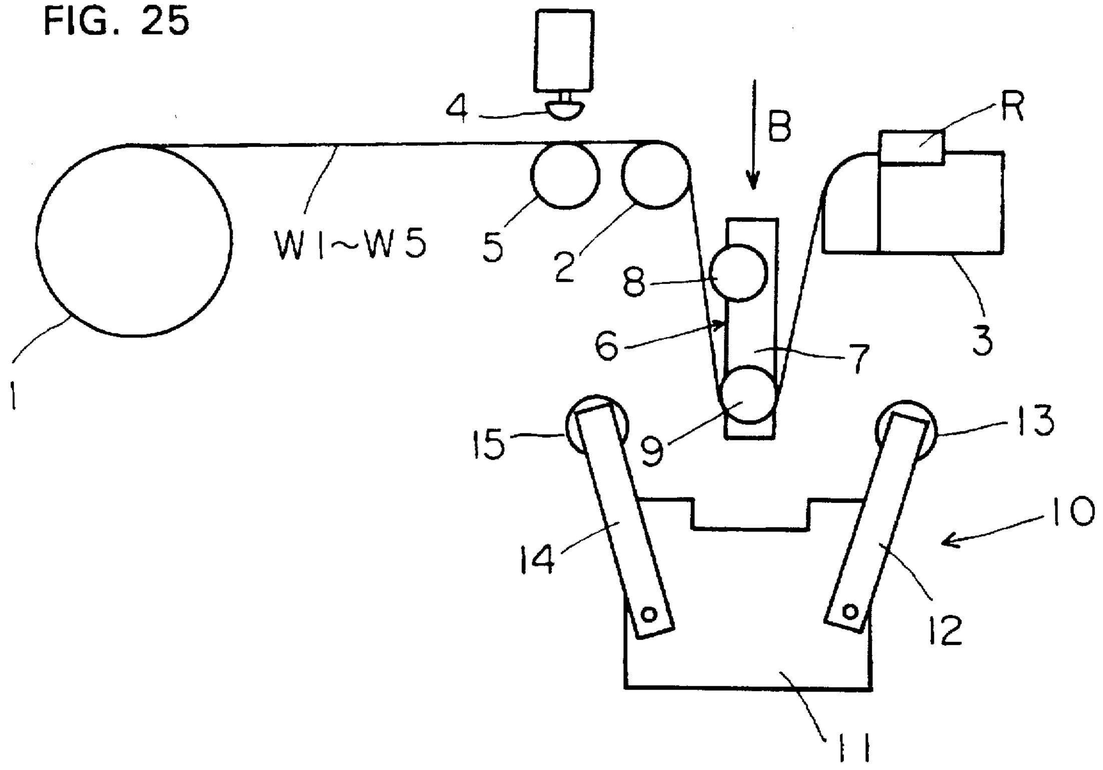
FIG. 25 schematically shows the wire-length measuring apparatus of FIG. 24 starting to measure the wires.

Then, the roller unit 6 is lowered to cause all wires W1 to W5 to yieldingly descend as indicated at B in FIG. 25, thus starting the wire measurement. Specifically, all wires W1 to W5 are fitted in the circumferential grooves 17 of the lower roller 9, and are pulled down.

Figure 26:
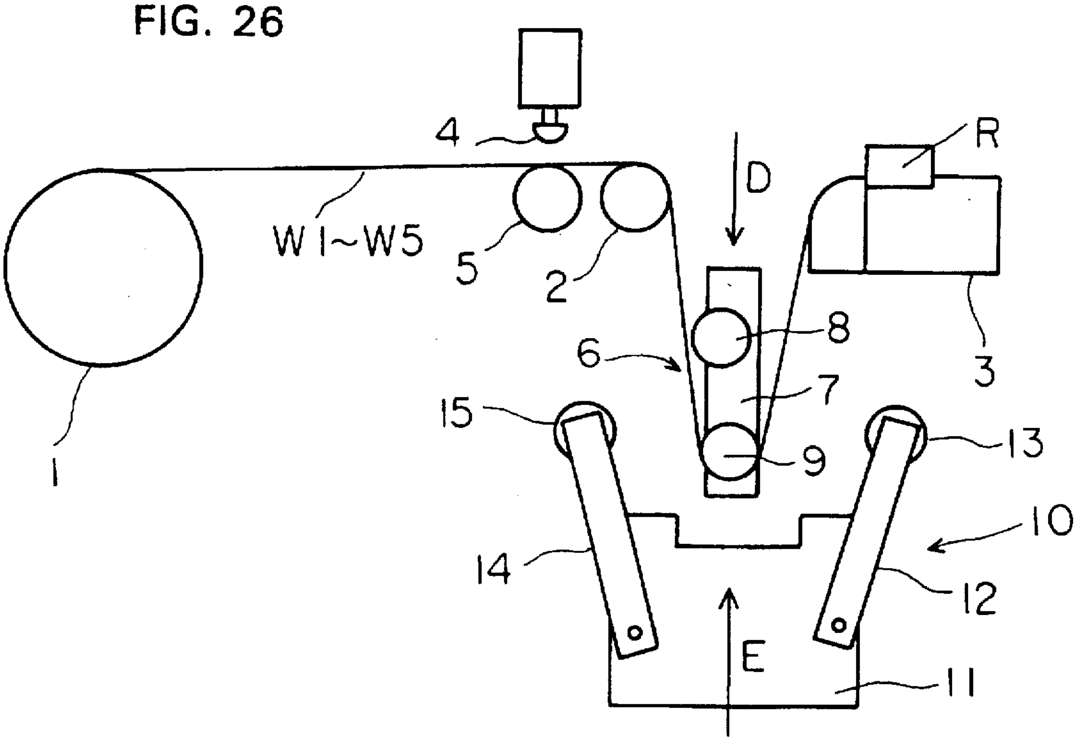
FIG. 26 schematically shows the wire-length measuring apparatus of FIG. 24 in the condition that its roller unit starts to lower.
Figure 27:
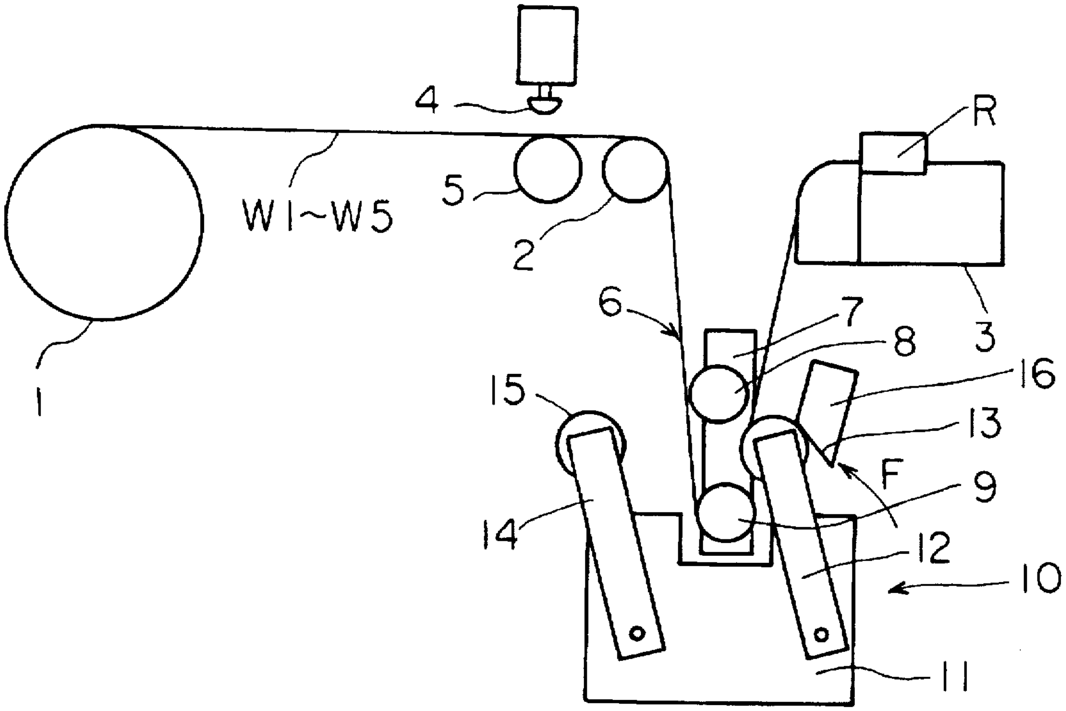
FIG. 27 schematically shows the wire-length measuring apparatus of FIG. 24 in the condition that wire measurement is effected.
Figure 28:
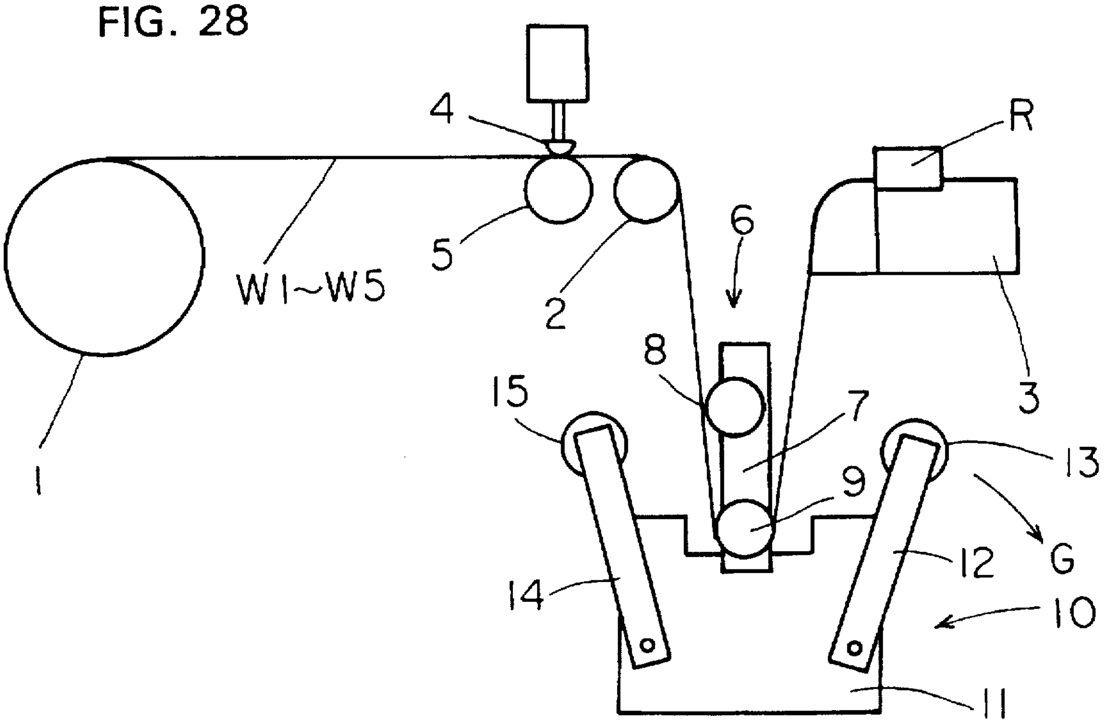
FIG. 28 schematically shows the wire-length measuring apparatus of FIG. 24 in the condition that its pinch rollers have returned to their original positions.

The roller unit 6 descends further as indicated by arrow D in FIG. 26. The descending amount depends on the wire length to be determined. The pinch roller 13 advances full distance forward, and the pinch roller unit 10 starts rising as indicated by arrow E.

Assume that two wires W4 and W5 are to be the longest length L1 and that three wires W1, W2 and W3 are to be a second shorter length L2. First, all wires W1 to W5 are lowered to a lowest level corresponding to the longest length L1 by the roller 9. Before completing the longest length wire measurement, only the swingable arm 12 rotates inward as indicated by arrow F in FIG. 27 to permit the pinch roller 13 to invade somewhat the area between the upper and lower rollers 8 and 9 on one side of the roller unit 6. Thus, all wires are pushed against the upper and lower rollers 8 and 9 by the pinch roller 13. At this time, the other pinch roller 15 remains spaced apart from the roller unit 6. Just before completion of the longest wire measurement the pinch roller 13 is withdrawn as indicated by arrow G in FIG. 28.

Figure 29:
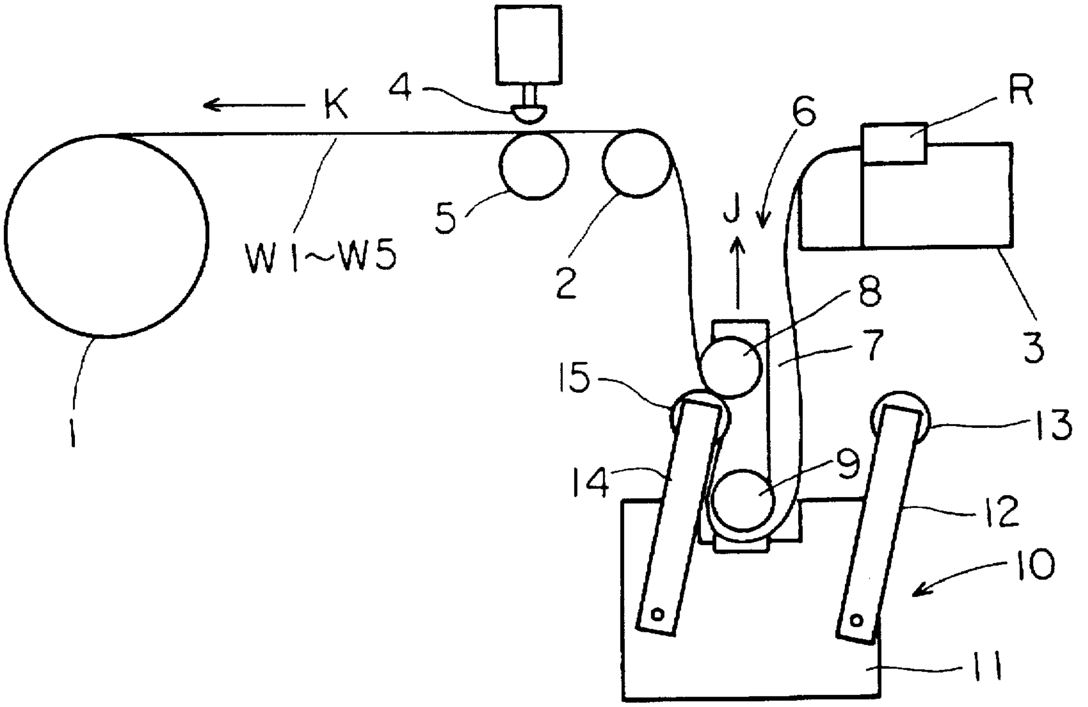
FIG. 29 schematically shows the wire-length measuring apparatus of FIG. 24 in the condition that its roller unit starts to rise to the level at which a second longest length measurement is effected.
Figure 30:
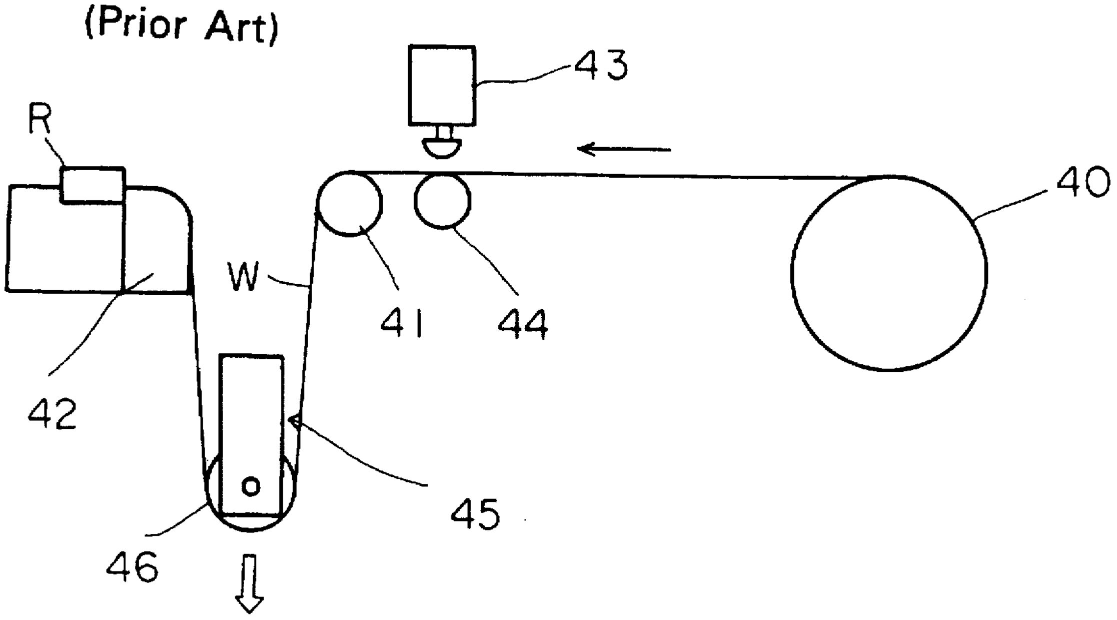
FIG. 30 (Prior Art)
FIG. 30 schematically shows a conventional wire-length measuring apparatus of the prior art.
Figure 31:
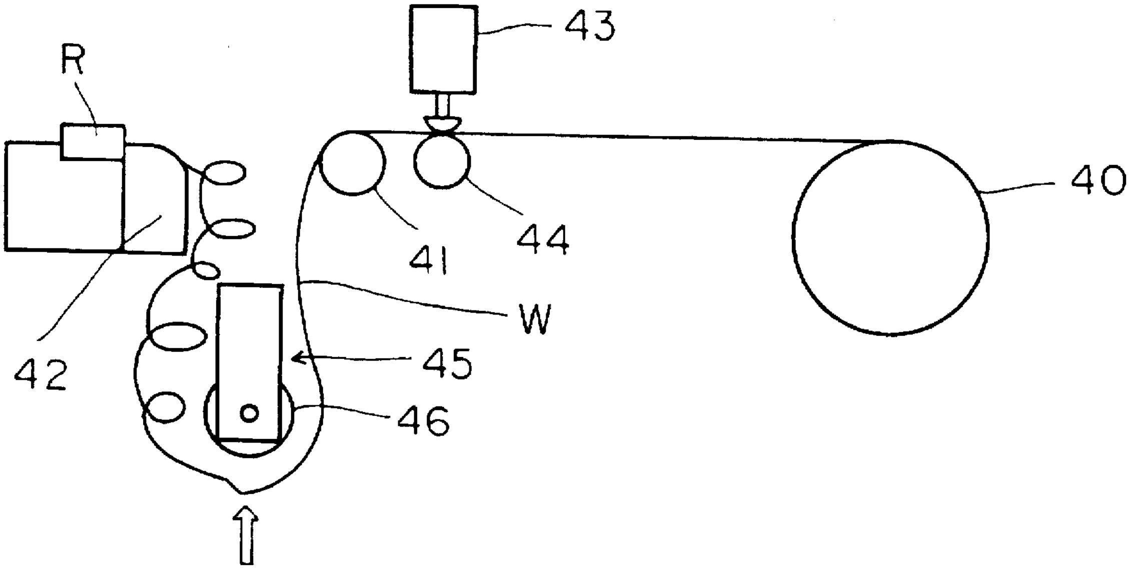
FIG. 31 (Prior Art)
FIG. 31 schematically shows how the prior art wire-length measuring apparatus causes the curling of the measured wires.

When the second longest wire measurement is performed on the wires W1 to W3, the lower rollers 9 of the roller unit 6 rises to a level corresponding to the second longest length L2 as indicated by arrow J in FIG. 29. Then, the wires W1 to W3 are withdrawn toward the wire supply reels 1 as indicated by arrow K to determine the second longest length L2. During this withdrawal the pinch roller 15 is moved into contact with the upper roller 8, pushing the withdrawn wires W1 to W3 against the upper roller 8. Thus, the curling of these wires are prevented. The apparatus otherwise works sequentially in the same way as the first embodiment.

As may be understood from the above, the wires to be measured can be advantageously prevented from curling in the course of measurement.

We claim:

1. In an apparatus for making an electrical harness having a plurality of wires and at least one electrical connector at a first end of said plurality of wires, said apparatus including:

an apparatus for supplying a plurality of wires along a first path;

means for supporting an electrical connector at a location along said first path;

guide means between said wire supply apparatus and said electrical connector supporting means for guiding said wires along said first path;

looper means between said wire supply apparatus and said electrical connector supporting means and movable along a second path in a direction generally perpendicular to said first path and including a lower wire engaging surface adjacent the bottom of said looper means to engage said wires in order to push a portion of each of said wires downward to establish the length Of the longest wire of said plurality of wires; and means for moving said looper means along said second path in a direction generally perpendicular to said first path;

the improvement comprising:

said looper means further including an upper arcuate surface spaced from and positioned above said lower wire engaging surface;

a first pinch member reciprocally movable between a remote first position spaced from said wires and a wire engaging second position, said wire engaging second position being located adjacent one of said lower wire engaging surface and said upper arcuate surface of said looper means to force at least some of said wires into engagement with said first pinch member and one of said lower wire engaging surface and said upper arcuate surface;

means for moving said first pinch member between said remote first position and said wire engaging second position.

2. The apparatus of claim 1 wherein said lower wire engaging surface is arcuate.

3. The apparatus of claim 2 wherein said lower wire engaging surface is located on a first roller rotatably mounted on a portion of said looper means.

4. The apparatus of claim 3 wherein said upper arcuate surface is a second roller rotatably mounted on a portion of said looper means above said first roller.

5. The apparatus of claim 4 wherein said first pinch member is a first pinch roller rotatably mounted on said harness making apparatus.

6. The apparatus of claim 4 further including a second pinch member reciprocally movable between a remote third position spaced from said wires and a wire engaging fourth position, said first pinch member being located adjacent said first roller when positioned at said wire engaging second position to force at least some of said wires into engagement with said first pinch member and said first roller, and said second pinch member being located adjacent said second roller when positioned at said wire engaging fourth position to force at least some of said wires into engagement with said second pinch member and said second roller.

7. The apparatus of claim 6 wherein said second pinch member is a second pinch roller rotatably mounted on said harness making apparatus.

8. The apparatus of claim 1 further including a second pinch member reciprocally movable between a remote third position spaced from said wires and a wire engaging fourth position adjacent said second path, said first pinch member being located adjacent said lower wire engaging surface when positioned at said wire engaging second position to force at least some of said wires into engagement with said first pinch member and said lower wire engaging surface, and said second pinch member being located adjacent said Upper arcuate surface when positioned at said wire engaging fourth position to force at least some of said wires into engagement with said second pinch member and said upper arcuate surface.

9. The apparatus of claim 1 wherein said upper arcuate surface is a roller rotatably mounted on a portion of said looper means above said lower wire engaging surface.

10. The apparatus of claim 1 wherein said first pinch member is a first pinch roller rotatably mounted on said harness making apparatus.

11. The apparatus of claim 1 wherein said upper arcuate surface is offset to one side of said second path relative to said lower wire engaging surface.

12. The apparatus of claim 1 wherein said lower wire engaging surface is located on a first arcuate roller rotatably mounted on a portion of said looper means, said upper arcuate surface is a second roller rotatably mounted on a portion of said looper means above said first roller, said first pinch member is a first pinch roller rotatably mounted on said harness making apparatus and further including a second pinch member reciprocally movable between a remote third position spaced from said wires and a wire engaging fourth position, said first pinch member being located adjacent said first roller when positioned at said wire engaging second position to force at least some of said wires into engagement with said first pinch member and said first roller, and said second pinch member being located adjacent said second roller when positioned at said wire engaging fourth position to force at least some of said wires into engagement with said second pinch member and said second roller.

13. In an apparatus for making an electrical harness having a plurality of wires and at least one electrical connector at a first end of said plurality of wires, said apparatus including:

an apparatus for supplying a plurality of wires along a first path;

means for supporting an electrical connector at a location along said first path;

guide means between said wire supply apparatus and said electrical connector supporting means for guiding said wires along said first path;

looper means between said wire supply apparatus and said electrical connector supporting means and movable along a second path in a direction generally perpendicular to said first path and including an arcuate lower wire engaging surface adjacent the bottom of said looper means to engage said wires in order to push a portion of each of said wires downward to establish the length of the longest wire of said plurality of wires; and means for moving said looper means along said second path in a direction generally perpendicular to said first path;

the improvement comprising:

said looper means further including an upper arcuate surface spaced from and positioned above said lower wire engaging surface;

a first pinch member reciprocally movable between a remote first position spaced from said wires and a wire engaging second position, said wire engaging second position being located adjacent said lower wire engaging surface to force at least some of said wires into engagement with said first pinch member and said lower wire engaging surface;

means for moving said first pinch member between said remote first position and said wire engaging second position;

a second pinch member reciprocally movable between a remote third position spaced from said wires and a wire engaging fourth position adjacent said second path, said second pinch member being located adjacent said upper arcuate surface when positioned at said wire engaging fourth position to force at least some of said wires into engagement with said second pinch member and said upper arcuate surface; and means for moving said second pinch member between said remote third position and said wire engaging fourth position.

14. The apparatus of claim 13 wherein said lower wire engaging surface is arcuate.

15. The apparatus of claim 14 wherein said lower wire engaging surface is located on a first roller rotatably mounted on a portion of said looper means.

16. The apparatus of claim 15 wherein said upper arcuate surface is a second roller rotatably mounted on, a portion of said looper means above said first roller.

17. The apparatus of claim 16 wherein said first pinch member is a first pinch roller rotatably mounted on said harness making apparatus.

18. The apparatus of claim 13 wherein said second pinch member is a second pinch roller rotatably mounted on said harness making apparatus.

19. The apparatus of claim 13 wherein said upper arcuate surface is offset to one side of said second path relative to said lower wire engaging surface.

* * * * *